United States Patent
Natsume (10) Patent No.: US 9,994,196 B2
(45) Date of Patent: Jun. 12, 2018

(54) WIPER DEVICE

(71) Applicant: ASMO CO., LTD., Kosai, Shizuoka-pref. (JP)

(72) Inventor: Takashi Natsume, Toyohashi (JP)

(73) Assignee: ASMO Co., Ltd., Kosai (JP)

(*) Notice: Subject to any disclaimer, the term of this patent is extended or adjusted under 35 U.S.C. 154(b) by 432 days.

(21) Appl. No.: 14/601,248

(22) Filed: Jan. 21, 2015

(65) Prior Publication Data

US 2015/0210250 A1 Jul. 30, 2015

(30) Foreign Application Priority Data

Jan. 27, 2014 (JP) ................... 2014-012483

(51) Int. Cl.
*B60S 1/08* (2006.01)
*B60S 1/06* (2006.01)
*B60S 1/04* (2006.01)

(52) U.S. Cl.
CPC .............. *B60S 1/08* (2013.01); *B60S 1/0402* (2013.01); *B60S 1/0452* (2013.01); *B60S 1/0818* (2013.01); *B60S 1/0822* (2013.01); *B60S 1/0866* (2013.01)

(58) Field of Classification Search
CPC .......... B60S 1/163; B60S 1/08; B60S 1/0402; B60S 1/0866; B60S 1/0818; B60S 1/0862; B60S 1/0452; B60S 1/0822; B60S 1/345; B60S 1/3418; B60S 1/3413; B60S 1/0463
USPC .............. 15/250.12, 250.13, 250.16, 250.17, 15/250.19; 318/DIG. 2
See application file for complete search history.

(56) References Cited

U.S. PATENT DOCUMENTS

2010/0162511 A1* 7/2010 Natsume .................. B60S 1/08
15/250.13

FOREIGN PATENT DOCUMENTS

| JP | H06-92203 A | 4/1994 |
| JP | 2007-153084 A | 6/2007 |
| JP | 2007-161052 A | 6/2007 |
| JP | 2008-174026 A | 7/2008 |

(Continued)

OTHER PUBLICATIONS

Machine translation of description portion of JP2007153084, published Jun. 2007.*

(Continued)

*Primary Examiner* — Gary Graham
(74) *Attorney, Agent, or Firm* — SOLARIS Intellectual Property Group, PLLC (57) ABSTRACT

A wiper device includes: a wiper motor including an output shaft configured to be forward-and-reverse rotated and causing to-and-fro operation of a wiper blade, the wiper blade being connected to the wiper motor via a wiper arm; an acquisition section that acquires positioning data or ambient temperature data; and a controller that controls the wiper motor such that the output shaft forward-and-reverse rotates within a first rotation angle to stop or return the wiper blade at or to a first lower position where the wiper blade is hidden by a rear end of an engine hood of the vehicle, and such that the output shaft forward-and-reverse rotates within a second rotation angle to stop or return the wiper blade at or to a second lower position above the first lower position where the wiper blade is not hidden by the rear end of the engine hood in a cold environment.

6 Claims, 5 Drawing Sheets

(56) References Cited

FOREIGN PATENT DOCUMENTS

| | | |
|---|---|---|
| JP | 2009-107598 A | 5/2009 |
| JP | 2010-158131 A | 7/2010 |

OTHER PUBLICATIONS

English language translation of the following: Office action dated Sep. 26, 2017 from the JPO in a Japanese patent application No. 2014-012483 corresponding to the instant patent application.
English language translation of the following: Office action dated Mar. 20, 2018 from the JPO in a Japanese patent application No. 2014-012483 corresponding to the instant patent application. This office action translation is submitted now in order to supplement the understanding of the cited reference which is being disclosed in the instant Information Disclosure Statement.

\* cited by examiner

WIPER DEVICE

CROSS-REFERENCE TO RELATED APPLICATIONS

This application claims priority under 35 USC 119 from Japanese Patent Application No. 2014-012483 filed on Jan. 27, 2014, the disclosure of which is incorporated by reference herein.

BACKGROUND OF THE INVENTION

Field of the Invention

The present invention relates to a wiper device.

Description of the Related Art

In recent years, fully concealed-type wiper devices are being adopted, in which, when stationary, wiper blades and wiper arms are hidden by a rear end of an engine hood in order to satisfy styling requirements and reduce vehicle aerodynamic resistance. However, since the wiper blades and the wiper arms of the fully concealed-type wiper device are hidden by the rear end of the engine hood, it is difficult to separate the wiper blades from a windshield glass by lock-back, in which the wiper arms are folded. It is therefore difficult to prevent the wiper blades from freezing against the windshield glass in winter.

Japanese Patent Application Laid-Open (JP-A) No. 2007-153084 describes a wiper control device in which weather data, etc. is obtained for the region in which the vehicle is present via a navigation device, and the stationary position of wiper blades is changed to a position where the wiper blade is not hidden by a rear end of an engine hood if there is a possibility of the wiper blades freezing.

The wiper control device described in JP-A No. 2007-153084 enables lock-back as described above and can prevent the wiper blades from freezing against the windshield glass by changing the stationary position of the wiper blades to a position where the wiper blade is not hidden by the engine hood rear end.

However, in the wiper control device described in JP-A No. 2007-153084, rotation force of a wiper motor that always rotates in the same direction is converted to to-and-fro operation of wiper arms by a link mechanism provided between the wiper motor and the wiper arms. The link mechanism accordingly becomes complex in order to change the stationary position, this also being the lower return position, of the wiper blades.

SUMMARY OF THE INVENTION

In consideration of the above circumstances, the present invention provides a fully concealed-type wiper device that can change the stationary position of the wiper blades using a simple configuration.

According to a first aspect of the present invention, a wiper device that includes a wiper motor that includes an output shaft, which is configured to be forward-and-reverse rotated, and that causes to-and-fro operation of a wiper blade on a surface of a windshield glass, the wiper blade being connected to the wiper motor via a wiper arm to which a rotation force of the output shaft is transmitted; an acquisition section that acquires one of either positioning data indicating a current position of a vehicle or ambient temperature data indicating an ambient temperature outside the vehicle; and a controller that controls the wiper motor such that the output shaft forward-and-reverse rotates within a range of a first rotation angle so as to stop or return the wiper blade at or to a first lower position where the wiper blade is hidden by a rear end of an engine hood of the vehicle, and that controls the wiper motor such that the output shaft forward-and-reverse rotates within a range of a second rotation angle so as to stop or return the wiper blade at or to a second lower position, which is above the first lower position and where the wiper blade is not hidden by the engine hood rear end, in a case in which it is determined that the vehicle is in a cold environment based on the one of either the positioning data or the ambient temperature data acquired by the acquisition device.

In the wiper device according to the first aspect of the present invention, in a case in which the vehicle is determined to be in a cold environment, the stationary position of the wiper blade can be changed using a simple configuration by reducing a rotation angle, this being a range in which the wiper motor forward rotates and reverse rotates, compared to normal operation.

According to a second aspect of the present invention in the wiper device of the first aspect of the present invention, in a case in which the acquisition device has acquired the ambient temperature data, the controller may determine that the vehicle is in a cold environment in a case in which an ambient temperature indicated by the ambient temperature data is below a specific threshold value.

In the wiper device according to the second aspect of the present invention, the stationary position of the wiper blade can be changed in a case in which the vehicle is in a cold environment.

According to a third aspect of the present invention in the wiper device of the first aspect of the present invention, in a case in which the acquisition device has acquired the positioning data, the controller may compute a position of the vehicle based on the positioning data, and determine whether or not the vehicle is in a cold environment based on the computed position.

In the wiper device according to the third aspect of the present invention, the stationary position of the wiper blade can be changed in a case in which the vehicle is in a cold environment.

According to a fourth aspect of the present invention in the wiper device of any one of the first aspect to the third aspect of the present invention, the wiper arm may include a hinge enabling the wiper blade to be separated from the windshield glass by bending the wiper arm toward a vehicle outer side direction as viewed from the windshield glass, and the hinge may be provided at a position where the hinge is not hidden by the engine hood rear end in a case in which the wiper blade is stationary in the second lower position.

In the wiper device according to the fourth second aspect of the present invention, the stationary position of the wiper blade can be changed to a position enabling lock-back using a simple configuration.

According to a fifth aspect of the present invention in the wiper device of any one of the first aspect to the fourth aspect of the present invention, the acquisition section may be one of either an ambient temperature sensor that detects ambient temperature, or a GPS positioning sensor that detects a position from GPS data.

In the wiper device according to the fifth aspect of the present invention, determination can be made that the vehicle is in a cold environment based on ambient temperature or positioning data by position-measurement using GPS.

BRIEF DESCRIPTION OF THE DRAWINGS

Preferred embodiments of the present invention will be described in detail based on the following figures, wherein.

DETAILED DESCRIPTION OF THE INVENTION

Figure 1:
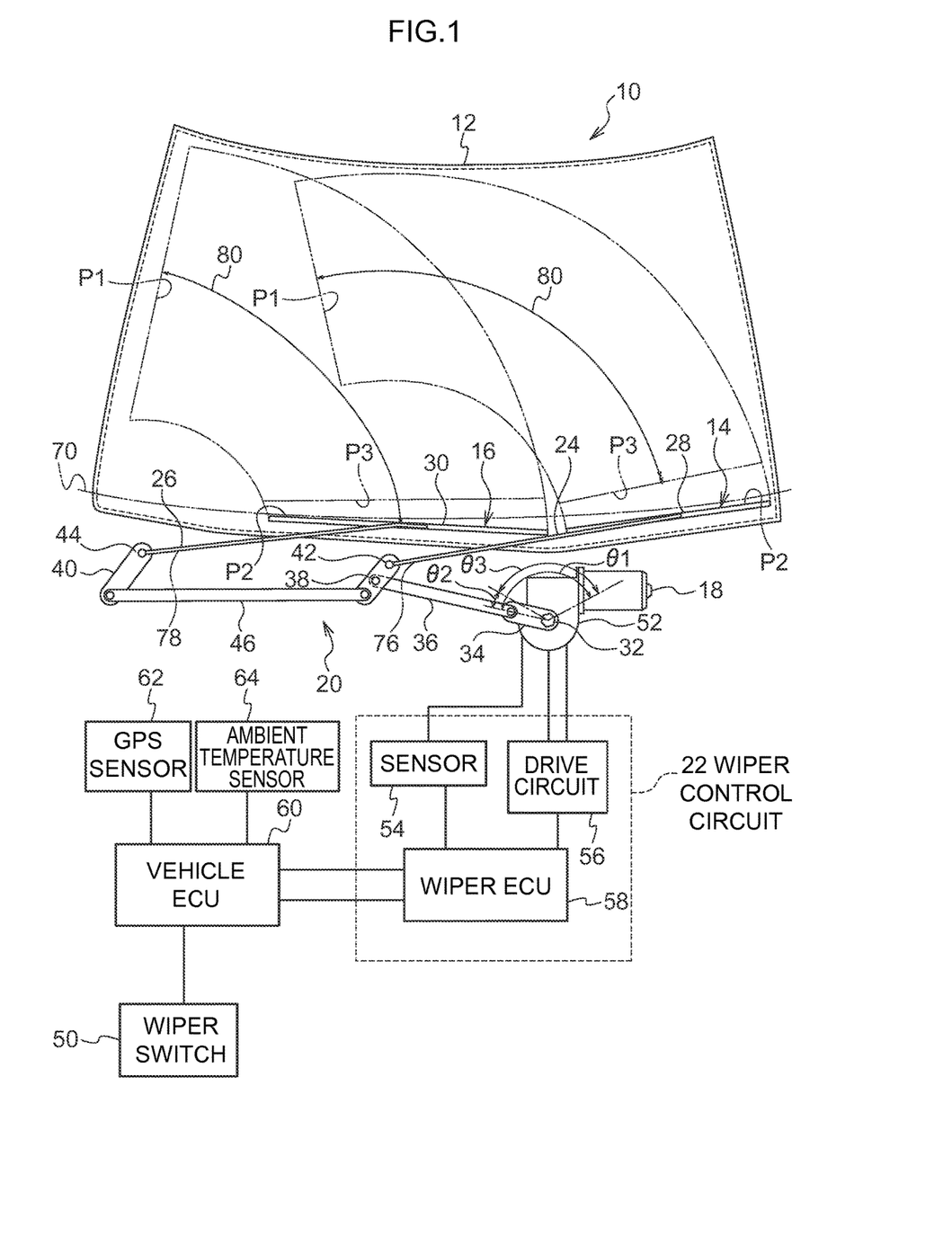
FIG. 1 is a schematic view illustrating a configuration of a wiper device according to an exemplary embodiment of the present invention.

FIG. 1 is a schematic view illustrating a configuration of a wiper device 10 according to an exemplary embodiment. The wiper device 10 wipes a windshield glass 12 included in a vehicle such as a passenger car, for example, and includes a pair of wipers 14, 16, a wiper motor 18, a link mechanism 20, and a wiper control circuit 22.

The wipers 14, 16 are configured by respective wiper arms 24, 26 and wiper blades 28, 30. Base end portions of the wiper arms 24, 26 are fixed at respective pivot shafts 42, 44, described later, and the wiper blades 28, 30 are fixed at respective leading end portions of the wiper arms 24, 26.

The wiper blades 28, 30 of the wipers 14, 16 swing to-and-fro on the windshield glass 12 accompanying swinging of the wiper arms 24, 26, and the wiper blades 28, 30 wipe the windshield glass 12. Hinges 76, 78, capable of lock-back, in which the wiper arms 24, 26 are folded toward a vehicle outer side direction as viewed from the windshield glass 12, are respectively provided at the wiper arms 24, 26.

The wiper motor 18 includes an output shaft 32 capable of forward and reverse rotation via a speed reduction mechanism 52 mainly configured by a worm gear. The link mechanism 20 includes a crank arm 34, a first link rod 36, a pair of pivot levers 38 and 40, the pair of pivot shafts 42, 44, and a second link rod 46.

One end side of the crank arm 34 is fixed at the output shaft 32, and the other end side of the crank arm 34 is pivotably coupled to one end side of the first link rod 36. The other end side of the first link rod 36 is pivotably coupled to a location toward an end of the pivot lever 38 that is different to the end with the pivot shaft 42. The two ends of the second link rod 46 are pivotably coupled to the end of the pivot lever 38 that is different to the end including the pivot shaft 42, and an end of the pivot lever 40 corresponding to this end of the pivot lever 38, respectively.

The pivot shafts 42, 44 are pivotably supported by pivot holders, not illustrated in the drawings, provided at the vehicle body. The wiper arms 24, 26 are each respectively fixed via the pivot shafts 42, 44 at the ends of the pivot levers 38, 40 including the pivot shafts 42, 44.

In the wiper device 10 according to the present exemplary embodiment, in a case in which the output shaft 32 is forward-and-reverse rotated with a swing range θ1, the rotation force of the output shaft 32 is transmitted via the link mechanism 20 to the wiper arms 24, 26, and the wiper blades 28, 30 swing to-and-fro over the windshield glass 12 between a lower return position P2 and an upper return position P1 as the wiper arms 24, 26 swing to-and-fro. The value of θ1 is set at 140° in the present exemplary embodiment as an example, however may take various values according to such factors as the configuration of the link mechanism of the wiper device.

In the wiper device 10 according to the present exemplary embodiment, as illustrated in FIG. 1, the crank arm 34 and the first link rod 36 configure a straight line in a case in which the wiper blades 28, 30 are positioned at the lower return position P2.

A lower return position P3 is provided above the lower return position P2. The wiper blades 28, 30 are moved to the lower return position P3 by the output shaft 32 rotating by θ2 from a state in which the wiper blades 28, 30 are at the lower return position P2. The value of θ2 is set at 10° in the present exemplary embodiment as an example, however may take various values according to such factors as the configuration of the link mechanism of the wiper device. In the present exemplary embodiment, the output shaft 32 is capable of forward-and-reverse rotation in a range θ3 that is smaller than θ1, enabling the wiper blades 28, 30 to be operated to-and-fro between the lower return position P3 and the upper return position P1, and to be stopped at the lower return position P3.

The wiper control circuit 22 for controlling the rotation of the wiper motor 18 is connected to the wiper motor 18. The wiper control circuit 22 of the present exemplary embodiment includes, for example, a sensor 54 that detects the rotation speed and rotation angle of the output shaft 32 of the wiper motor 18, and a drive circuit 56 that generates a current for operating the wiper motor 18 using PWM control, and supplies the current to the wiper motor 18.

If the wiper motor 18 is a brushless DC motor, then the drive circuit 56 includes an inverter circuit in which a MOSFET is employed as a switching element, and generates voltage with a specific duty ratio under control of a wiper Electronic Control Unit (ECU) 58, described later.

The wiper motor 18 according to the present exemplary embodiment includes the speed reduction mechanism 52 as mentioned above, and so the rotation speed and rotation angle of the output shaft 32 are not the same as the rotation speed and rotation angle of the wiper motor body. However, in the present exemplary embodiment, the wiper motor body and the speed reduction mechanism 52 are integrally configured inseparable to each other, and so the rotation speed and rotation angle of the output shaft 32 are taken for the rotation speed and rotation angle of the wiper motor 18 below.

The sensor 54 is provided inside the speed reduction mechanism 52 of the wiper motor 18, and detects by converting into current a magnetic field (magnetic force) of an excitation coil or a magnet that rotates coupled to the output shaft 32.

The wiper control circuit 22 includes the wiper ECU 58 that is capable of computing the position of the wiper blades 28, 30 on the windshield glass 12 from the rotation angle of the output shaft 32 detected by the sensor 54, and controls the drive circuit 56 so as to change the rotation speed of the output shaft 32 according to this position. A wiper switch 50 is connected to the wiper ECU 58 of the wiper control circuit 22 via a vehicle ECU 60. If the wiper switch 50 is ON, the wiper ECU 58 computes the rotation speed of the output shaft 32 according to a signal output from the wiper switch 50, and controls the drive circuit 56 so that the output shaft 32 rotates at the computed rotation speed.

The wiper switch 50 is a switch for switching ON or OFF power supplied from a vehicle battery to the wiper motor 18. The wiper switch 50 is switchable between a low speed operation mode selection position that causes the wiper blades 28, 30 to swing at low speed, a high speed operation mode selection position that causes the wiper blades 28, 30 to swing at high speed, an intermittent operation mode selection position that causes the wiper blades 28, 30 to swing intermittently at a specific cycle, and a storage (stationary) mode selection position. The wiper switch 50 outputs a signal corresponding to the selection position for each mode to the wiper ECU 58 via the vehicle ECU 60.

In a case in which a signal corresponding to the selection position of a respective mode has been output from the wiper switch 50 and input to the wiper control circuit 22 via the vehicle ECU 60, the wiper ECU 58 inside the wiper control circuit 22 then performs control according to the output signal from the wiper switch 50.

The vehicle ECU 60 is a device that performs integrated control of the vehicle engine, the active suspension, occupant protection devices such as airbags, air conditioning and the like, besides the wiper device 10. The vehicle ECU 60 is connected to the wiper ECU 58 by communicating using, for example, a Local Interconnect Network (LIN) protocol. In order to secure redundancy of the system, the wiper ECU 58 and the vehicle ECU 60 may be connected using communication other by LIN.

A GPS sensor 62 that receives a Global Positioning System (GPS) signal from a satellite and detects GPS positioning data for the vehicle, and an ambient temperature sensor 64 that detects the ambient temperature around the vehicle and outputs a signal according to the ambient temperature, are connected to the vehicle ECU 60. In the present exemplary embodiment, the vehicle ECU 60 computes the current position of the vehicle from the GPS positioning data detected by the GPS sensor 62. In a case in which the computed current position is in a cold region, the ECU 60 rotates the output shaft 32 of the wiper motor 18 by θ2, and instructs the wiper ECU 58 to move the wiper blades 28, 30 that are stationary in the lower return position P2 to the lower return position P3.

In a case in which the ambient temperature around the vehicle detected by the ambient temperature sensor 64 is below a specific threshold value, the vehicle ECU 60 rotates the output shaft 32 by θ2, and instructs the wiper ECU 58 to move the wiper blades 28, 30 that are stationary in the lower return position P2 to the lower return position P3. The specific threshold value is set at 4° C. as an example.

In the present exemplary embodiment, in cold regions, or in a case in which the ambient temperature is low, moving the wiper blades 28, 30 to the lower return position P3 that is a position in which the wiper blades 28, 30 are not hidden by an engine hood rear end 70 enable lock-back, in which the wiper arms 24, 26 are folded toward the vehicle outer side direction.

Figure 2:
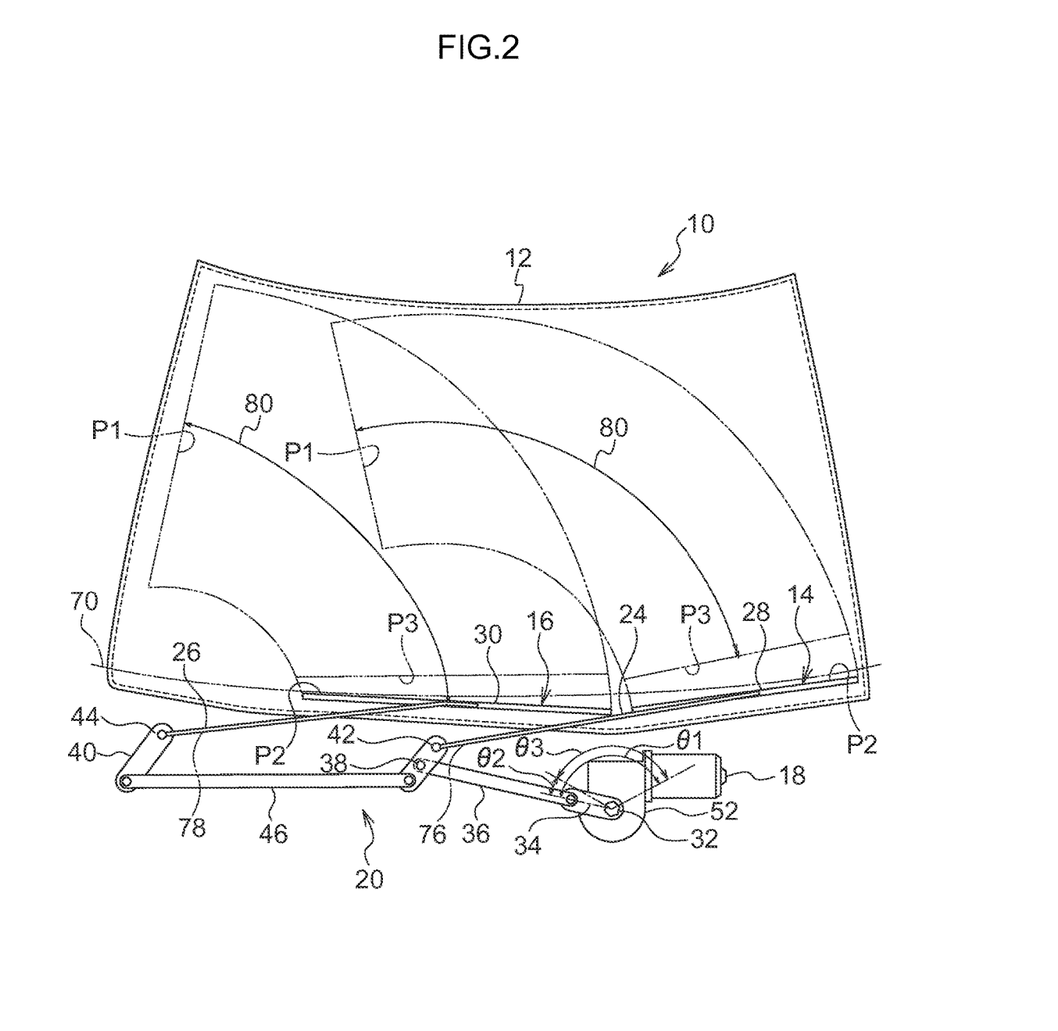
FIG. 2 is a schematic view illustrating a wiping range of wiper blades during normal operation of a wiper device according to an exemplary embodiment of the present invention.

FIG. 2 is a schematic view illustrating a wiping range of the wiper blades 28, 30 of the wiper device 10 according to the present exemplary embodiment during normal operation. In FIG. 2, the wiper blades 28, 30 wipe over a normal operation wiping range 80 between the lower return position P2 and the upper return position P1 by forward-and-reverse rotation of the output shaft 32 of the wiper motor 18 over the range θ1.

Figure 3:
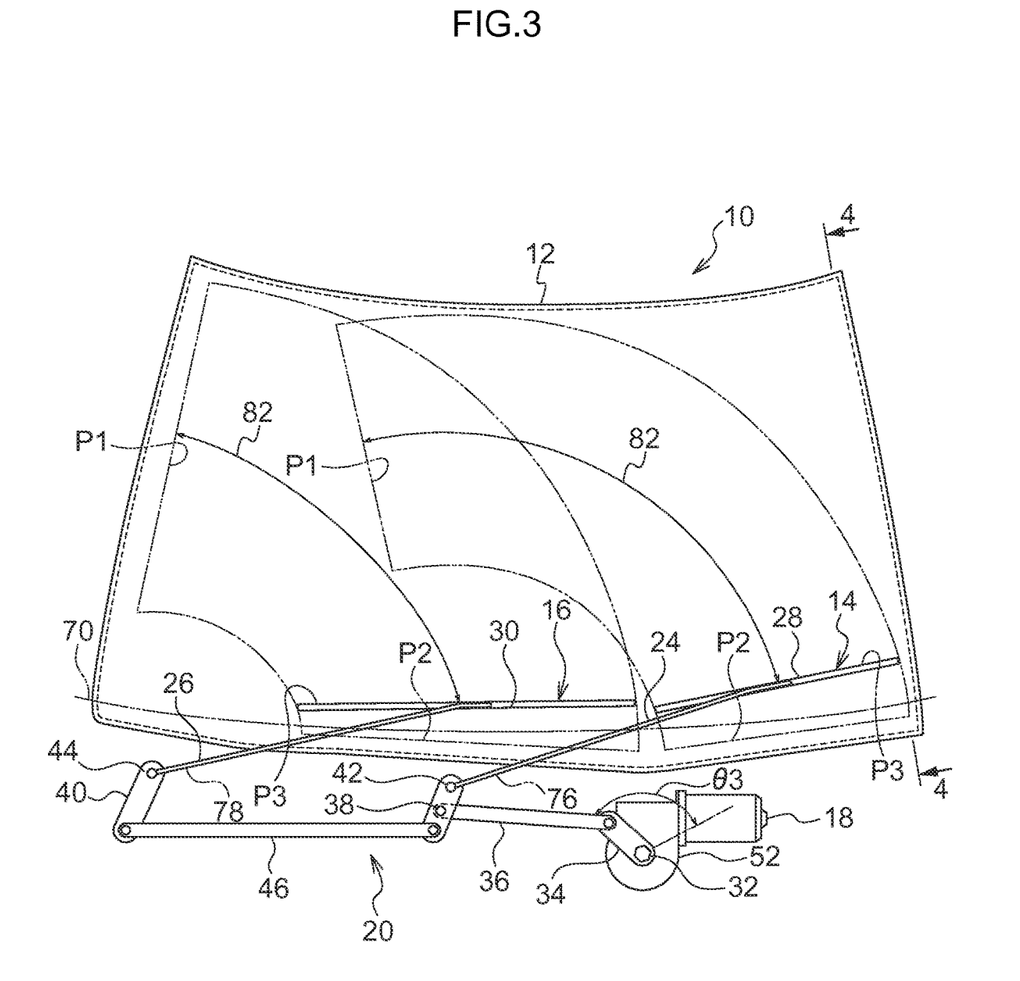
FIG. 3 is a schematic view illustrating a wiping range of wiper blades during cold weather operation of a wiper device according to an exemplary embodiment of the present invention.

FIG. 3 is a schematic view illustrating a wiping range of the wiper blades 28, 30 of the wiper device 10 according to the present exemplary embodiment during cold weather operation. As previously described, if the vehicle ECU 60 detects that the vehicle is present in a cold region, or the ambient temperature is below the specific threshold value, the wiper device 10 according to the present exemplary embodiment stops the wiper blades 28, 30 at the lower return position P3. In FIG. 3, the wiper blades 28, 30 wipe over a cold weather operation wiping range 82 between the lower return position P3 and the upper return position P1 by forward-and-reverse rotation of the output shaft 32 of the wiper motor 18 over the range θ3.

Figure 4A:
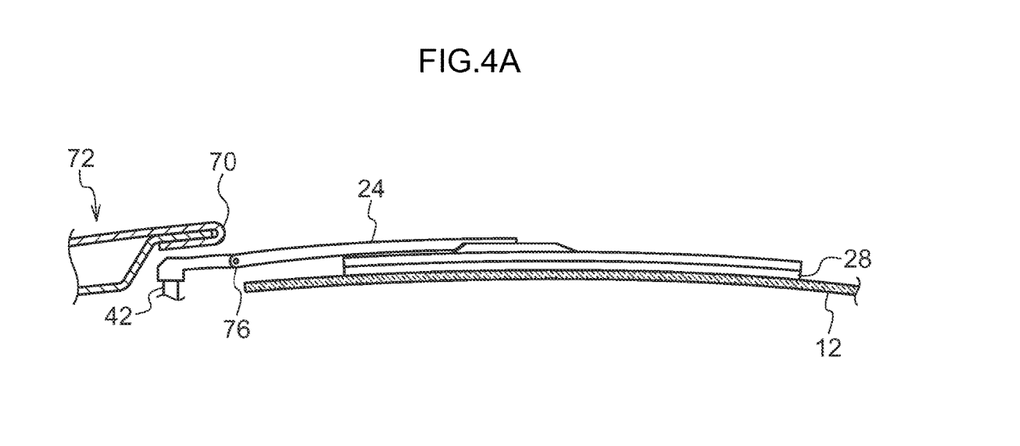
FIG. 4A is an enlarged cross-section of the windshield glass and the engine hood illustrated in FIG. 1, taken along line 4-4 in FIG. 3, illustrating the wiper arm not in a lock-back state.
Figure 4B:
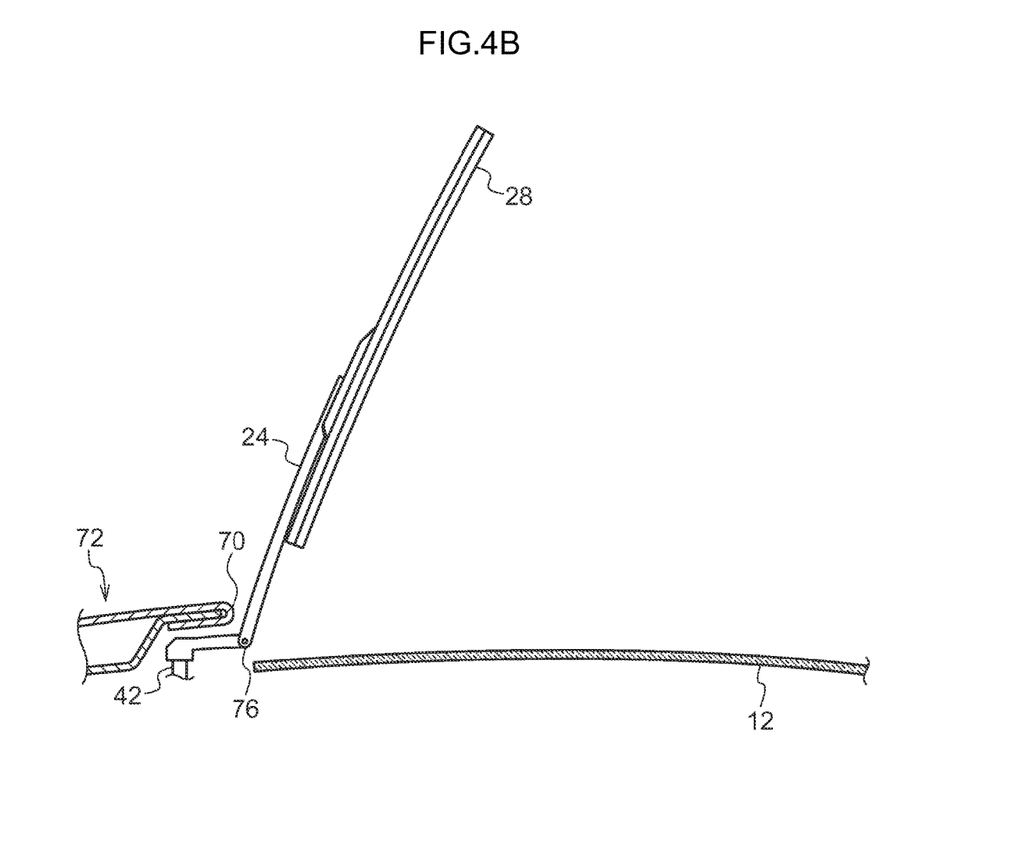
FIG. 4B is an enlarged cross-section of the windshield glass and the engine hood illustrated in FIG. 1, taken along line 4-4 in FIG. 3, illustrating the wiper arm in a lock-back state.

FIG. 4A and FIG. 4B are enlarged cross-sections of the windshield glass 12 illustrated in FIG. 1 and an engine hood 72, taken along line 4-4 in FIG. 3. FIG. 4A illustrates the wiper arm 24 not in a lock-back state, and FIG. 4B illustrates the wiper arm 24 in a lock-back state. The wiper arms 24, 26 include the respective hinges 76, 78, enabling lock-back, near the pivot shafts 42, 44.

In FIG. 4A, the wiper blade 28 is stationary in the lower return position P3 and is not hidden by the engine hood rear end 70, as illustrated in FIG. 3. In the present exemplary embodiment, the hinge 76 is also in a position where the hinge 76 is not hidden by the engine hood rear end 70 in a case in which the wiper blade 28 is stationary in the lower return position P3.

FIG. 4B illustrates a case in which the wiper arm 24 is folded at the hinge 76, and is in the lock-back state. Since the hinge 76 is in a position where the hinge 76 is not hidden by the engine hood rear end 70 as illustrated in FIG. 4A, there is no interference of the wiper arm 24 with the engine hood rear end 70, even if the wiper arm 24 is folded as illustrated in FIG. 4B.

As previously described, in a case in which the vehicle is in a cold region or in a case in which the ambient temperature is below the specific threshold value, the wiper device 10 according to the present exemplary embodiment operates the wiper blades 28, 30 to wipe between the lower return position P3 and the upper return position P1. Since there is no interference of the wiper arms 24, 26 with the engine hood rear end 70 even if the wiper device 10 is operated with the wiper blades 28, 30 in the lock-back state, damage to the engine hood rear end 70 and the wiper arms 24, 26 can be prevented.

Figure 5:
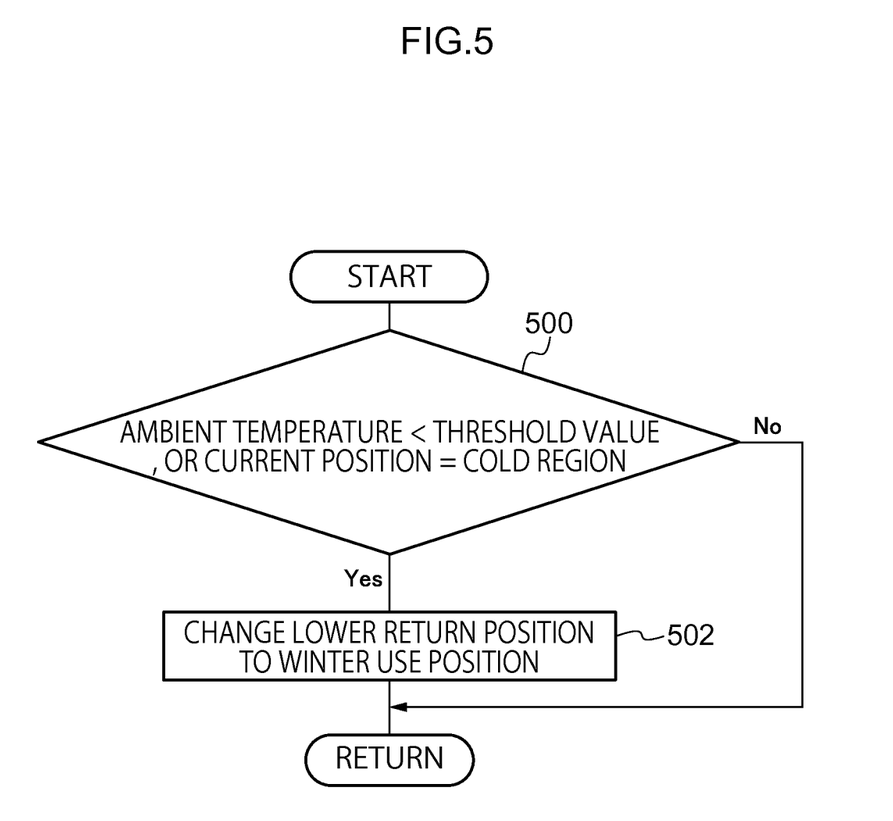
FIG. 5 is a flowchart illustrating an example of processing relating to changing a lower return position of a wiper device according to an exemplary embodiment of the present invention.

FIG. 5 is a flowchart illustrating an example of processing relating to changing the lower return position of the wiper device 10 according to the present exemplary embodiment. At step 500, determination is made as to whether or not the ambient temperature around the vehicle detected by the ambient temperature sensor 64 is below the specific threshold value, or determination is made as to whether or not the position of the vehicle is in a cold region based on the GPS positioning data of the vehicle detected by the GPS sensor 62.

If determination is affirmative at step 500, at step 502 the stationary position of the wiper blades 28, 30 is changed from the lower return position P2 to the lower return position P3, this being a winter use position, the wiper blades 28, 30 are moved to the lower return position P3, and processing returns. Note that determination as to whether or not the wiper blades 28, 30 have actually moved from the lower return position P2 to the lower return position P3 is made using the position of the wiper blades 28, 30 on the windshield glass 12, computed based on a signal from the sensor 54.

If determination is negative at step 500, processing is returned without changing the stationary position of the wiper blades 28, 30. Determination at step 500 as to whether not the vehicle position is in a cold region based on the vehicle GPS positioning data detected by the GPS sensor 62 is made, for example, as follows.

Data such as the latitude and longitude of location points corresponding to cold regions are pre-stored in a storage device of the vehicle ECU 60, and determination is made that the vehicle is in a cold region in a case in which the vehicle position computed based on the GPS signal corresponds to a cold region stored in the storage device.

If a navigation device is provided that detects the vehicle position based on GPS signals and map data with recorded location points corresponding to cold regions, then determination is made that the vehicle is in a cold region in a case in which the vehicle position computed based on the GPS signal corresponds to a cold region stored in the map data.

If the navigation device has a communication function, data of cold regions where the wiper blades would freeze may be acquired from a data server or the like, and determination may be made as to whether or not the vehicle position computed based on the GPS signal corresponds to a cold region in the acquired data.

As explained above, the wiper device 10 according to the present exemplary embodiment normally stops the wiper blades 28, 30 at the lower return position P2 in which the wiper blades 28, 30 are hidden by the engine hood rear end 70. However, the wiper device 10 can stop the wiper blades 28, 30 at the lower return position P3 in a case in which the location in which the vehicle is present is a cold environment and there is a possibility that wiper blades 28, 30 may freeze. At the lower return position P3, neither the wiper blades 28, 30 nor the hinges 76, 78 of the wiper arms 24, 26 are hidden by the engine hood rear end 70.

The wiper motor 18 of the wiper device 10 operates the wiper blades 28, 30 to-and-fro by forward-and-reverse rotation of the output shaft 32 over a specific range. In the wiper device 10 according to the present exemplary embodiment, the return position and the stationary position of the wiper blades 28, 30 can be changed by changing the range of forward-and-reverse rotation of the output shaft 32.

Specifically, the range of forward-and-reverse rotation of the output shaft 32 is controlled such that the lower return position and stationary position of the wiper blades 28, 30 is a position in which neither the wiper blades 28, 30 nor the hinges 76, 78 are hidden by the engine hood rear end 70. In the present exemplary embodiment, the wiper blades 28, 30 return at the lower return position P3, and stop at the lower return position P3 by setting the forward-and-reverse rotation range of the output shaft 32 to θ3, that is narrower than the normal θ1. This enables provision of a fully concealed type wiper device that can change the stationary position of the wiper blades using a simple configuration.

Embodiments of the present invention are described above, but the present invention is not limited to the embodiments as will be clear to those skilled in the art.

What is claimed is:

1. A wiper device, comprising:
a wiper motor that comprises an output shaft, which is configured to be forward-and-reverse rotated, and that causes to-and-fro operation of a wiper blade on a surface of a windshield glass, the wiper blade being connected to the wiper motor via a wiper arm to which a rotation force of the output shaft is transmitted;
an acquisition device that acquires one of either positioning data indicating a current position of a vehicle or ambient temperature data indicating an ambient temperature outside the vehicle; and
a controller that controls the wiper motor such that the output shaft forward-and-reverse rotates within a range of a first rotation angle so as to stop or return the wiper blade at or to a first lower position where the wiper blade is hidden by a rear end of an engine hood of the vehicle, and that controls the wiper motor such that the output shaft forward-and-reverse rotates within a range of a second rotation angle so as to stop or return the wiper blade at or to a second lower position, which is above the first lower position and where the wiper blade is not hidden by the engine hood rear end, in a case in which it is determined that the vehicle is in a cold environment based on the one of either the positioning data or the ambient temperature data acquired by the acquisition device,
wherein the wiper arm includes a hinge enabling the wiper blade to be separated from the windshield glass by bending the wiper arm toward a vehicle outer side direction as viewed from the windshield glass, and
wherein the hinge is provided at a position where the hinge is not hidden by the engine hood rear end in a case in which the wiper blade is stationary in the second lower position.

2. The wiper device of claim 1, wherein, in a case in which the acquisition device has acquired the ambient temperature data, the controller determines that the vehicle is in a cold environment in a case in which an ambient temperature indicated by the ambient temperature data is below a specific threshold value.

3. The wiper device of claim 2, wherein the acquisition device is an ambient temperature sensor.

4. The wiper device of claim 1, wherein, in a case in which the acquisition device has acquired the positioning data, the controller computes a position of the vehicle based on the positioning data, and determines whether or not the vehicle is in a cold environment based on the computed position.

5. The wiper device of claim 4, wherein the acquisition device is a GPS positioning sensor that detects a position from GPS data.

6. The wiper device of claim 1, wherein the acquisition device is one of either an ambient temperature sensor that detects ambient temperature, or a GPS positioning sensor that detects a position from GPS data.

* * * * *